US012583096B2

(12) United States Patent
Schmidt et al.

(10) Patent No.: US 12,583,096 B2
(45) Date of Patent: Mar. 24, 2026

(54) MARKING SYSTEM AND METHOD FOR MARKING

(71) Applicant: Hilti Aktiengesellschaft, Schaan (LI)

(72) Inventors: Peer Schmidt, Lindau (DE); Daniel Fladerer, Dornbirn (AT)

(73) Assignee: Hilti Aktiengesellschaft, Schaan (LI)

( * ) Notice: Subject to any disclaimer, the term of this patent is extended or adjusted under 35 U.S.C. 154(b) by 488 days.

(21) Appl. No.: 18/018,724

(22) PCT Filed: Aug. 10, 2021

(86) PCT No.: PCT/EP2021/072248
§ 371 (c)(1),
(2) Date: Jan. 30, 2023

(87) PCT Pub. No.: WO2022/043048
PCT Pub. Date: Mar. 3, 2022

(65) Prior Publication Data
US 2023/0302626 A1      Sep. 28, 2023

(30) Foreign Application Priority Data

Aug. 24, 2020    (EP) ..................................... 20192318

(51) Int. Cl.
B25H 7/04          (2006.01)
E01C 23/16          (2006.01)
(Continued)

(52) U.S. Cl.
CPC ............. B25H 7/045 (2013.01); G01C 15/02 (2013.01)

(58) Field of Classification Search
CPC ....... B25H 7/045; G01C 15/02; E01C 23/163; E01C 23/22
(Continued)

(56) References Cited

U.S. PATENT DOCUMENTS 5,829,147 A      11/1998  Kousek et al.
6,074,693 A  *   6/2000  Manning ............... E01C 23/163
404/93
(Continued)

FOREIGN PATENT DOCUMENTS

DE            19634800 A1      3/1998
DE            19902075 A1      8/2000

OTHER PUBLICATIONS

International Searching Authority, International Search Report and Written Opinion in International Application No. PCT/EP2021/072248, mailed Nov. 24, 2021.

*Primary Examiner* — Peter J Macchiarolo
*Assistant Examiner* — Anna Josephine Saunders
(74) *Attorney, Agent, or Firm* — Leydig, Voit & Mayer, Ltd.

(57)          ABSTRACT

A method for applying a position marking for a working position to a substrate, for example a wall, a ceiling, a floor or the like, at a marking position assigned to it, comprising: a. unsystematically or systematically moving a portable marking system over a marking area of the substrate; b. determining at least one position of the marking system; c. marking at the determined position of the marking system, provided that the determined position coincides with the marking position or at least coincides with the marking position to a predefined or predefinable degree of accuracy. The invention also relates to a marking system.

18 Claims, 2 Drawing Sheets

(51) Int. Cl.
    *E01C 23/22*         (2006.01)
    *G01C 15/02*         (2006.01)

(58) Field of Classification Search
    USPC ........................................................ 33/18.1
    See application file for complete search history.

(56)                References Cited

U.S. PATENT DOCUMENTS

| | | | | |
|---|---|---|---|---|
| 6,588,868 | B1 | 7/2003 | Skultety-Betz | |
| 9,233,751 | B2 * | 1/2016 | Metzler | B64C 19/00 |
| 9,563,863 | B2 * | 2/2017 | Nielsen | G06Q 10/063 |
| 10,048,069 | B2 * | 8/2018 | Romero | G01C 15/04 |
| 10,365,101 | B2 * | 7/2019 | Nam | G01C 25/00 |
| 11,193,767 | B1 * | 12/2021 | Olsson | B65D 83/184 |
| 11,255,669 | B1 * | 2/2022 | Khnifes | B65D 83/184 |
| 11,435,182 | B2 * | 9/2022 | Hajmousa | G01C 15/06 |
| 12,152,879 | B1 * | 11/2024 | Renteria | G01C 11/02 |
| 2010/0263591 | A1 * | 10/2010 | Nielsen | E01C 23/20 |
| | | | | 118/712 |
| 2012/0072035 | A1 * | 3/2012 | Nielsen | B05B 12/004 |
| | | | | 700/283 |
| 2017/0102467 | A1 * | 4/2017 | Nielsen | G01S 19/47 |
| 2023/0302626 | A1 * | 9/2023 | Schmidt | E01C 23/163 |

* cited by examiner

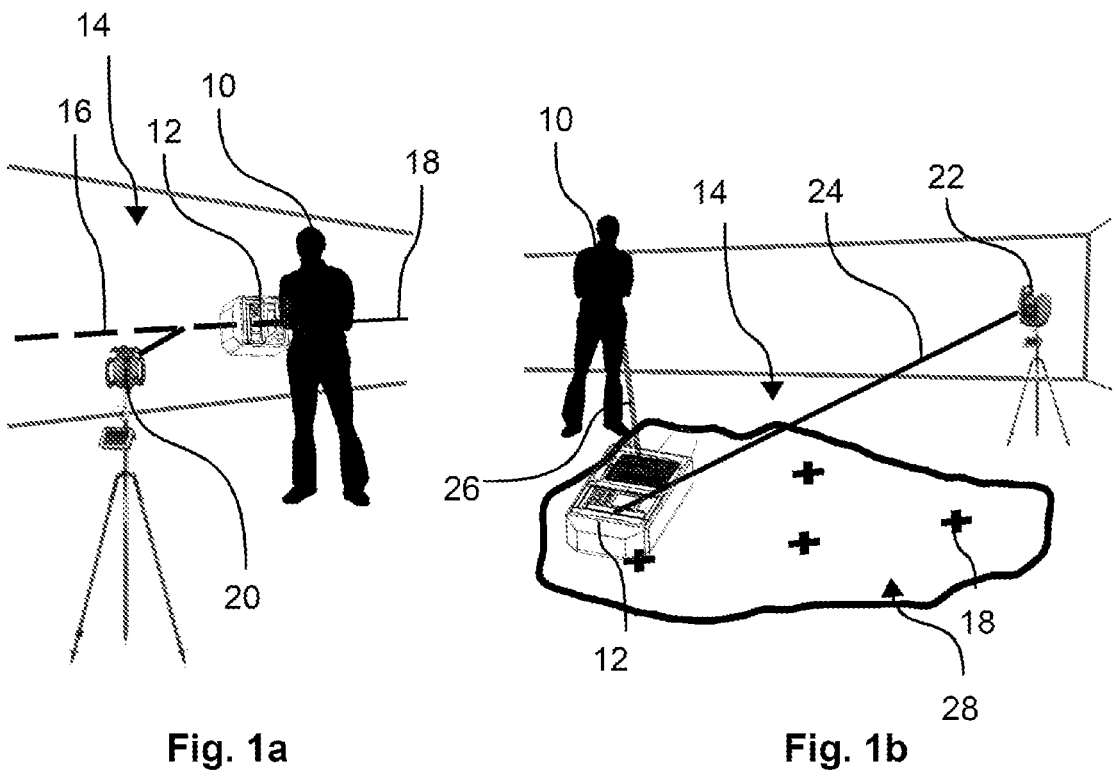
Fig. 1a                    Fig. 1b
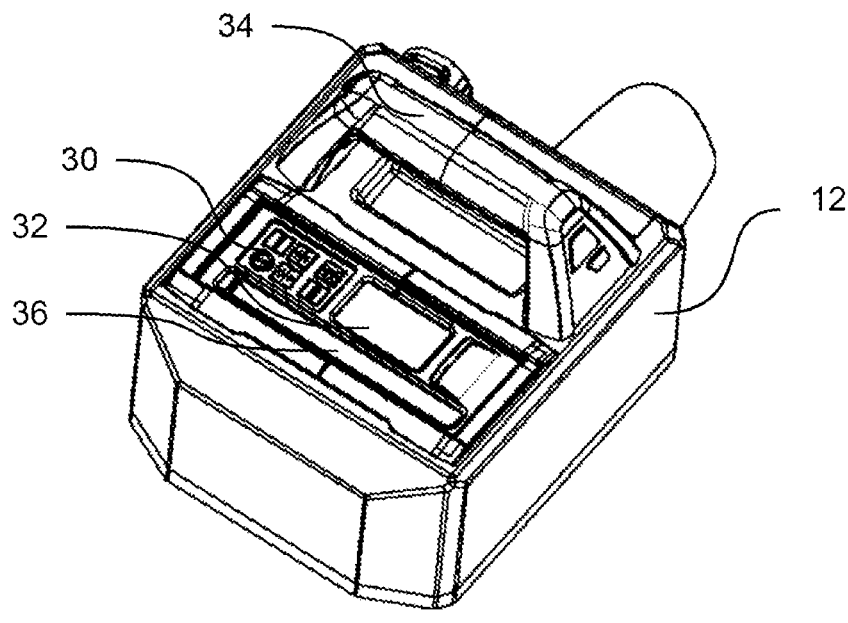
Fig. 2

MARKING SYSTEM AND METHOD FOR MARKING

CROSS-REFERENCE TO RELATED APPLICATIONS

This patent application is the U.S. National Stage of International Patent Application No. PCT/EP2021/072248, filed Aug. 10, 2021, which claims the benefit of European Patent Application No. 20192318.2, filed Aug. 24, 2020, which are each incorporated by reference.

The present invention relates to a method for applying a position marking for a working position to a substrate, for example a wall, a ceiling, a floor or the like, at a marking position assigned to the position marking. The invention also relates to a marking system.

Usually, in the course of construction work on building elements, working positions, for example borehole positions or cutting lines, are measured and marked by means of position markings in order to then be able for example to drill or saw precisely. This necessary preliminary work is not only very time-consuming, it is also often fraught with considerable measurement errors.

It is therefore the object of the present invention to present a method and a marking system which allow position markings for working positions to be applied to a substrate in a particularly precise and time-saving manner.

The object is achieved by a method for applying a position marking for a working position to a substrate, for example a wall, a ceiling, a floor or the like, at a marking position assigned to it, comprising the steps of:

a. unsystematically or systematically moving a portable marking system within a marking area;

b. determining, preferably regularly determining, at least one position of the marking system;

c. marking at the determined position of the marking system, provided that the determined position coincides with the marking position or at least coincides with the marking position to a predefined or predefinable degree of accuracy.

The invention is thus based on the idea that a user who would like to apply the position marking to the substrate generally knows or can estimate at least approximately the area where the position marking is to be located. If, for example, a breakthrough for a supply line for a sanitary element, for example a water supply line for a wash basin, is to be made, the user can estimate that this breakthrough has to be in an area near, but below, the wash basin. The user can thus bring the marking system into this vicinity of the wash basin and move it systematically or unsystematically within a certain area, and thus within a marking area. As soon as the marking system reaches the marking position in a suitable manner, the marking system can then apply the position marking precisely on the basis of the determination of its position according to the method. There is therefore no longer any need for manual measuring or manual marking; incorrect placements of the position markings are avoided and the time required can be reduced considerably.

Since position markings are usually small in relation to the size of the substrate, for example a wall or a floor, the marking area can also be selected to be relatively small. In particular, the marking area can be selected as the area of the substrate that contains and surrounds the marking position. In addition, the marking area can be selected to be relatively small. For example, it may comprise at most 10 percent, particularly preferably at most 3 percent, of the surface of the substrate. The marking area may for example comprise less than 1 m², preferably less than 0.5 m². Meanwhile, the substrate, for example a wall to be provided with the position marking, may have an area to be marked of at least 10 m², in particular also of at least 50 m². Thus, the time required can also be reduced by selecting such a relatively small marking area.

In particular, the position marking may have a monochrome and/or linear form, such as a line, a cross and/or a circle. As an alternative or in addition, it may also include at least one symbol, number and/or character.

The position marking may be applied to the surrounding area by spraying, for example by means of an ink-jet nozzle or the like, by pressing on and/or sticking on, by mechanical processing, for example by engraving, and/or by means of electromagnetic waves, for example by means of a laser, in particular by local heating.

The position determined or to be determined of the marking system may correspond to a position of a marking unit of the marking system or a marker of the marking unit, for example an ink-jet nozzle. In particular, the position may correspond to a position within the marking system at which the marking system processes the substrate, for example applies a colored dot to the substrate. For this purpose, the position of a target point within the marking system may be determined and the position of the marking system deduced from the position of the target point by adding a suitable offset value. For this purpose, the offset value may be vector-valued.

Despite the considerable advantages that the method according to the invention brings with it by using the marking system, the production effort for the marking system can be kept low. Since according to the method the position of the marking system is monitored, it is ultimately sufficient that the marking system reaches the marking position in a suitable manner at some point in time. Complex and cost-intensive mechanics, such as for example in the case of printing machines, in particular plotters for large areas, through which the marking system can travel with high precision on a predetermined route within a very large travel range to the marking position, are therefore not required.

It is also not necessary to fix the marking system on the substrate, in particular not even if a vertically oriented wall or a downward-facing surface of a ceiling is used as the substrate. Thus, for example, ceilings or the like can also be provided with position markings.

The position marking and/or the marking position may be stored in a BIM (Building Information Modeling) model, a CAD model and/or the like. In general, they can come from a building plan and/or a construction plan.

A "portable" system may be understood as meaning a system that can be kept in suspension by a user for a long period of time. In particular, the portable system may have a weight of at most 10 kg, preferably of at most 3 kg, particularly preferably of at most 2 kg.

The marking system may be made up of a number of parts. For example, the position determining system may have a separate transmitting part and a receiving part located on the rest of the marking system part. The portability of the marking system may then only relate to one of the parts of the marking system, in particular to a part to be moved and/or to be kept in suspension by the user.

The degree of accuracy, and thus a maximum permissible distance between the marking position determined in relation to the surrounding area and the marking position to be determined, may be limited to at most 1 cm, preferably at most 2 mm, particularly preferably at most 1 mm.

It is conceivable that at least two position markings are applied to the substrate. For this purpose, the marking area may be selected as a non-contiguous area. In particular, in each case partial areas in which at least one of the marking positions of the respective position markings is in each case to be expected may be selected. The marking area may then be made up of the partial areas.

"Marking at the determined position" may be understood as meaning that the complete position marking is applied to the substrate. Alternatively or in addition, this may be understood as meaning that only part of the position marking is applied when the marking position is suitably reached. If, for example, a cross is to be applied, it is conceivable to apply only part of the cross, for example one of the four arms of the cross, to the substrate when a corresponding position is reached. The remaining parts of the cross may then be applied at later points in time, when suitably offset positions have been reached.

According to the method, an additional step may be provided, a step within which information that part of the position marking or the position marking as a whole has been applied to the surrounding area is stored in a memory. Before the part of the position marking or the position marking as a whole is possibly applied again, it may then be checked in a further method step whether the respective part of the position marking or the position marking as a whole has already been applied. A potential double application of this part or of the position marking as a whole can then be avoided.

In the case of a particularly preferred class of methods, a stationary coordinate system may be established in relation to the substrate. In particular, the coordinate system may be established independently of the marking system. A reference point of the coordinate system may be selected for example in the area of a corner of the surrounding area. The system may be established before step a. The coordinate system may be formed as one-dimensional, two-dimensional or three-dimensional. The marking position, and thus the location of the position marking, can thus be established in relation to the coordinate system.

A position of the marking system is preferably also determined. The position may be determined in relation to the direction of gravity. The offset value can thus be suitably adapted on the basis of the knowledge of the position.

Further time savings can be achieved if at least two positions and/or a position range of the marking system are determined in parallel.

A marking unit with at least two markers, preferably at least 24 markers, particularly preferably at least 128 markers, may be used for marking at the determined position. For this purpose, the marking unit may in particular correspond to an arrangement of multiple markers. The arrangement may be formed as linear or flat, in particular polygonal. The position of the marking system that is determined or to be determined may correspond to the position of one of the markers. Several positions of the marking system are preferably determined in the sense of step b of the method. Such a position of the marking system is particularly preferably determined for each of the markers. This can be done by determining the position of the target point and then adding marker-specific offset values. These offset values may also be vector-valued.

At least one of the markers may be an ink-jet nozzle, a mechanical dye transmitter, for example a stamp, a processing tip, for example a controllable tip of a needle, for point-processing of the substrate or the like.

The movement may be performed passively. For example, the user of the marking system may move the marking system manually over the marking area. The movement may be a swiping movement. As an alternative or in addition, it may be a movement that can be carried out by the user and is preferably ergonomic for the user.

A particularly large number of applications, and thus special benefits, result when the position marking is marked on and/or in a building or a building element, that is to say when the surrounding area is a building or a building element. A building element may also be understood as meaning a sub-element, for example part of a wall. In general, the method is particularly suitable for use in the field of building construction and/or civil engineering.

Time savings can also be achieved if several position markings are marked within the marking area. For this purpose, the correspondence of the position of the marking system according to step c with regard to each marking position of the respective position markings can be checked.

If—as described above and is often the case—at least a rough estimate of the marking position is possible, the marking system may first be moved to a starting point within the marking area as part of an initial positioning in order to keep the marking area as small as possible, and thus to achieve a further time saving.

The scope of the invention also includes a marking system for marking a position marking for a working position on a substrate, for example a wall, a ceiling, a floor or the like, at a marking position assigned to the position marking, comprising a marking unit with at least one marker, a position determining system for detecting a position of the marking system and a control unit which is set up to mark a position marking or at least part of the position marking on the substrate at least once by means of the marking unit if the marking system is at the marking position or in a measuring range corresponding to a predefined or predefinable degree of accuracy around the marking position and not to mark a marking if the marking system is outside the measuring range.

In particular, the marking system may be set up to carry out the method according to the invention.

Thus, a marking system for marking a position marking on a substrate, for example a wall, a ceiling, a floor or the like, at a marking position assigned to the position marking, comprising a marking unit with at least one marker, a position determining system for detecting a position of the marking system and a control unit which is set up to implement the method according to the invention also generally comes within the scope of the invention.

The position determining system may be set up to determine the position of the marking system in relation to a coordinate system that can be defined or is defined independently of the marking system and/or is stationary.

The marking system may have a memory unit for storing at least one marking position of at least one position marking.

The marking system may have a handle to make manual movement easier for the user.

As an alternative or in addition, the marking system may have a guide rod and/or a receptacle for a guide rod. The marking system can thus be moved over the substrate in the manner of a mop or the like.

A precise position determination of the marking system can be achieved if the marking system has at least one distance sensor, for example a laser distance measuring device, a structured light source in connection with a structured-light-receiving and evaluation unit, a transit time sensor, also referred to as a time-of-flight sensor, and/or an acceleration sensor. The marking system may preferably have at least two distance sensors. The at least two distance sensors may detect distances at an angle, in particular at a right angle, to one another. The distance sensor or sensors may be self-taring. For example, at least one distance sensor may automatically align itself for measurement in a vertical direction. Alternatively or in addition, for example, also at least one distance sensor may automatically align itself for measurement in a horizontal direction.

As an alternative or in addition, the marking system, in particular the position determining system, may have at least one acceleration sensor, speed sensor and/or path length sensor. The marking system, in particular the position determining system, may have an inter- and/or extrapolation unit for inter- and/or extrapolation of a position of the marking system. Such a sensor may form part of the inter- and/or extrapolation unit or be set up to transmit at least one of its measurement results to the inter- and/or extrapolation unit. Such a sensor may work optically, for example by means of an optical scanning of the substrate in the manner of a laser-based computer mouse.

It is also conceivable that the marking system is set up to provide the user with an augmented reality (AR) perception or virtual reality (VR) perception of his or her surroundings. For this purpose, the marking system may have an AR system, for example AR glasses, or a VR system, for example VR glasses. The marking system may then be set up to display the position marking to the user by means of the AR system or the VR system, in particular before it is applied to the surrounding area. This can help the user to bring the marking system into the vicinity of the marking position.

The marking system, in particular the position determining system, may have a tachymeter, in particular a total station, and/or be set up for communication with a tachymeter. By using a tachymeter, positions can be easily determined with particularly high precision.

In the case of one class of embodiments it may be provided that the marking system comprises a motorized means of transport or that the marking system can be arranged on the motorized means of transport. The means of transport may be unmanned. It may be formed as moving and/or movable autonomously. The means of transport may be a flying object such as a drone and/or a vehicle, for example a driving robot, or have such a device.

The marking system preferably comprises a power source. The power source may be rechargeable; for example, the power source may be a rechargeable battery, in particular a lithium-based battery.

A particularly simple variant of the method, and thus also a particularly simple embodiment of the marking system set up to implement the method, can be achieved if a position to be marked is projected onto the substrate.

For example, a height position to be marked can be defined by means of a rotary laser and/or a line laser in the form of a line of light projected onto the substrate. The portable marking system may have an optical receiver, preferably a line sensor with multiple light-sensitive pixels.

The user can then move the portable marking system over the substrate in the area of the projected line of light. This area can form the marking area.

The position of the marking system can be determined by checking whether the optical receiver, in particular one of the light-sensitive pixels, detects light from the projected line of light. For this purpose, the light of the line of light may preferably be encoded by the rotary and/or line laser, for example amplitude-modulated or clocked. The position can thus be determined as the relative position of the optical receiver or the relevant pixel in relation to the line of light, possibly corrected by an offset value.

The optical receiver may be assigned a marker and, in particular in the case of multiple pixels, one or more of the pixels may be respectively assigned a suitably positioned marker, which is activated as soon as the optical receiver or the respective pixel detects light from the line of light. In addition, the optical receiver may have pixels, in particular off-center, to which no marker is assigned. If light from the line of light is detected by one of these pixels, this means that the marking system is held too far from or below the line of light. Corresponding directional arrows can accordingly be displayed to the user on a display unit as position information or as an indication of the direction in which the marking system should be moved.

The marking system can thus be set up to apply to the surrounding area a light geometry projected onto the surrounding area, for example a line, a point and/or a circle. The marking system may thus be set up in particular to trace the light geometry, for example by means of ink or printing ink, on the surrounding area.

In order to achieve the most precise possible reproduction of the light geometry, the marking system may be set up to determine at least one angle of incidence of the light geometry. In particular, the optical receiver may be set up to determine for each pixel of the optical receiver an angle of incidence for a light incident on the respective pixel.

Preferably, the marking system may then be set up to select a marker while taking into account the offset, obtained computationally from the respective angle of incidence, between the original point of incidence, i.e. without the presence of the marking system, of a point of light of the light geometry on the substrate to be marked and the actual point of incidence, i.e. in the presence of the marking system, of the point of light on the optical receiver.

As an alternative or in addition, the optical receiver may be arranged just above the substrate to be marked. The optical receiver, in particular at least one of its pixels, preferably all of the pixels, may be arranged and/or able to be arranged, in particular with its light-sensitive surface, less than 5 cm, in particular less than 1 cm, most particularly preferably less than 5 mm, for example less than 3 mm, from the substrate to be marked. Accordingly, a height of the marking system in the area of the optical receiver may be less than 5 cm, in particular less than 1 cm, most particularly preferably less than 5 mm, for example less than 3 mm. These measures can also allow a particularly precise reproduction of the light geometry, in particular a particularly accurately localized reproduction of the light geometry.

The marking system may also be operable in several operating modes. One operating mode may correspond to a device of the marking system by means of which the marking system is set up to implement a respective variant of the method according to the invention.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

In the schematic drawing, exemplary embodiments of the invention are shown and explained in more detail in the following description.

In the figures:

FIGS. 1a and 1b show schematic representations of a marking system that can be operated in two operating modes and its use by a user;

FIG. 2 shows a perspective representation of a marking system obliquely from above;

To facilitate understanding, the same reference numerals are assigned wherever possible to elements that are the same or at least functionally corresponding elements in the various figures of the drawing and in the following description of the figures.

Figure 3:
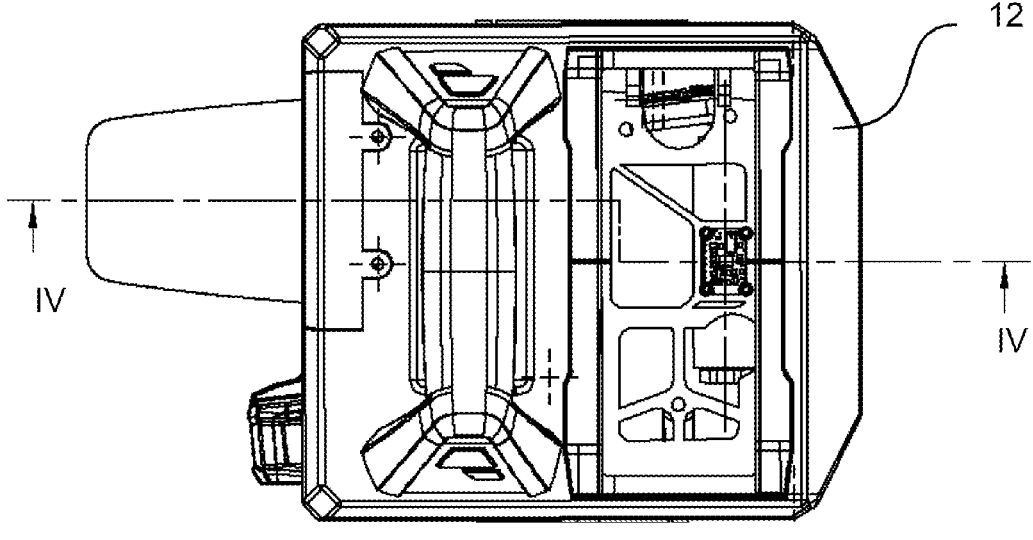
FIG. 3 shows a plan view of the marking system according to FIG. 2.

FIG. 1a shows a user 10 who is using a portable marking system 12. In the situation shown in FIG. 1a, the marking system 12 is operated in a first operating mode, in which the marking system 12 traces a line of light 16 projected onto a surrounding area 14, here a wall. The surrounding area 14, i.e. the wall, forms a building element, and thus part of a building.

To distinguish the line of light 16 from a position marking 18 generated by the marking system 12 as described below, the line of light 16 is represented by dashed lines in FIG. 1a.

The line of light 16 is generated by a rotary laser 20. The rotary laser 20 is set up to project the line of light 16 horizontally onto the surrounding area 14 at a desired height, resulting for example from a construction plan. Corresponding to the line of light 16, the course of the line of light 16 is now intended to be marked as a position marking 18, in particular permanently, on the surrounding area 14. For example, the position marking 18 may then be provided as a marking for a later course of a cutting line of a breakthrough through the surrounding area 14, that is to say through the wall, or as a marking of a working position along which a cut is to be made. A stationary, at least one-dimensional coordinate system that is independent of the marking system 12 is thus produced in this operating mode in each case by the height defined by the line of light 16 as a reference and a vertical line as the coordinate axis.

In order to mark the position marking 18, the user 10 moves the marking system 12, for example from a lateral end of the surrounding area 14 to an opposite lateral end such that the line of light 16 falls on an optical receiver of the marking system 12. The optical receiver has a certain extent, in particular vertical in the position of the marking system 12 according to FIG. 1a, so that the user 10 only needs to move the marking system 12 approximately horizontally along the line of light 16. In particular, the user 10 can move the marking system 12 above and below as well as along the line of light 16 in a marking area resulting approximately from the size of the optical receiver.

The marking system 12 has a marking unit with multiple markers on a side facing the substrate 14. Depending on the pixel through which the light of the line of light 16 is detected, a control unit of the marking system 12 possibly controls a marker of the marking unit assigned to the pixel and thereby emits ink onto the surrounding area 14 at a position that suitably corresponds to the respective pixel, so that in the course of time the position marking 18 is applied on the surrounding area 14. In the event that no marker is assigned to the respective pixel, position information in the form of directional arrows is displayed on a display unit of the marking system 12.

FIG. 1b shows the user 10 when using the portable marking system 12 in a second operating mode. In this second operating mode, position markings 18 of a construction plan that are stored in a memory unit of the marking system 12, including their marking positions, are marked directly on a substrate 14, here a floor. This surrounding area 14, i.e. the floor, also forms a building element and thus part of a building. Several position markings 18 of the position markings 18 to be marked have already been marked at the time shown in FIG. 1b.

The position markings 18, which in FIG. 1b are schematically shown as crosses and of which only one position marking 18 is marked with a reference symbol for the sake of clarity, may for example represent markings of working positions at which, for example, bores or the like are to be provided.

In contrast to the variant of the method described above with reference to FIG. 1a, in the variant shown in FIG. 1b the marking system 12 is assisted by a motorized total station 22, in determining the position by a position determining system of the marking system 12. For this purpose, the marking system 12, in particular its position determining system, is set up to communicate bidirectionally with the total station 22. The total station 22 continuously tracks the marking system 12, determines its position in relation to a predefined, stationary coordinate system in relation to the substrate 14, and transmits the determined position, in particular corresponding coordinates, to the marking system 12. For this purpose, the marking system 12 detects by means of its optical receiver whether and, if so, on which pixel of the optical receiver a measuring beam 24 of the total station 22 falls and in turn continuously communicates this to the total station 22.

The user 10 moves the marking system 12 with the aid of a guide rod 26 within a marking area 28, in which he expects position markings 18 still to be marked. The guide rod 26 allows a manual swiping movement and thus, for the user 10, a particularly ergonomic and also rapid movement of the marking system 12.

In summary, FIG. 1a and FIG. 1b each show variants of a method for applying a position marking 18 for a working position to a substrate 14, here a wall or a floor, at a marking position assigned to it, comprising the steps of:

a. unsystematically or systematically moving the portable marking system 12 over a marking area 28 (according to FIG. 1b) of the substrate 14;

b. regularly determining at least one position of the marking system 12;

c. marking at the determined position of the marking system 12, provided that the determined position coincides with the marking position at least to a predefined degree of accuracy with the marking position.

The predefined degree of accuracy results here in particular from the distance between the individual pixels of the optical receiver and the accuracy with which positions of the respectively assigned markers can be determined from the determined positions of the pixels.

The portable marking system 12 described here for marking the respective position markings 18 on the respective substrate 14 at the marking positions assigned to the position markings 18, i.e. along the line of light 16 according to FIG. 1a or stored marking positions, consequently comprises in summary a marking unit with multiple markers, a position determining system for detecting a position of the marking system 12 and a control unit which is set up to mark in each case one of the position markings 18 or at least part of the respective position marking 18 on the substrate 14 at least once by means of the marking unit if the marking system 12 is at the marking position or in a measuring range corresponding to the predefined degree of accuracy around the respective marking position and not to mark a marking if the marking system 12 is outside the measuring range.

The structure of the marking system 12 will now be explained in more detail on the basis of the following figures.

FIG. 2 shows for this purpose a perspective representation of the marking system 12.

The marking system 12 has an operating unit 30 with a display unit 32. The marking system 12 can be switched to the various operating modes by means of the operating unit 30. The marking system 12 is also set up to display status information about the marking system 12 on the display unit 32, for example a filling level of an ink supply or a state of charge of a rechargeable battery. It is also set up, as described above, to show position information on the display unit 32, for example instructions to the user 10 (FIG. 1) in the form of directional arrows as to the direction in which the marking system 12 is preferably to be moved.

The control unit and the position determining system are integrated in the operating unit 30. These are formed by an electronic circuit with a microprocessor unit, a memory unit in which corresponding program codes are stored in an executable manner, a communication interface and with other correspondingly required electronic components.

The marking system 12 also has a handle 34. The handle 34 is detachably arranged on the marking system 12 and can be exchanged for a receptacle for the guide rod 26 (see FIG. 1b) with which the guide rod 26 can be attached to the marking system 12.

An optical receiver 36 can also be seen. The optical receiver 36 has a linear form. It is formed as a line sensor. It extends at least substantially over the entire width of the marking system 12.

Figure 4:
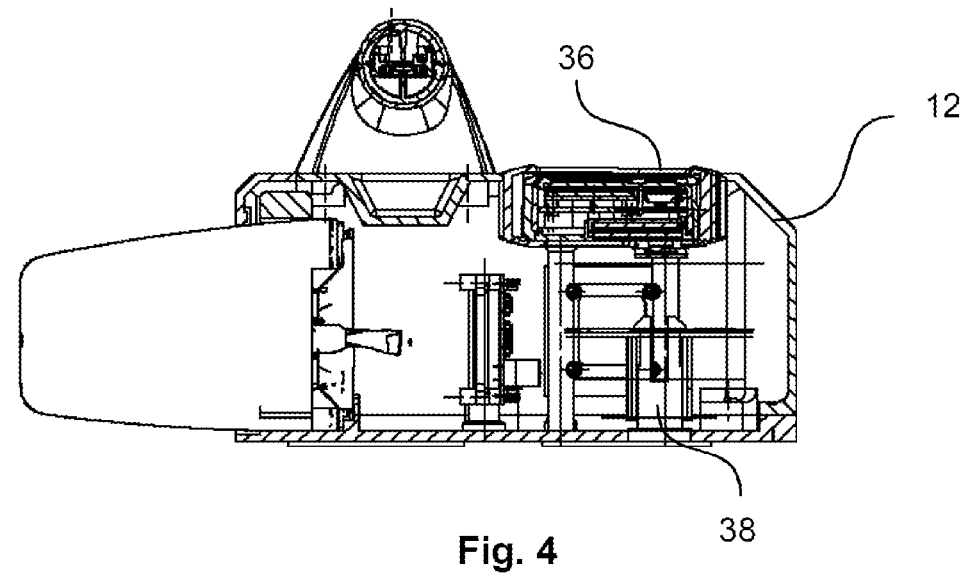
FIG. 4 shows a sectional view of the marking system according to FIG. 2.

FIG. 3 shows a plan view of the marking system 12. FIG. 4 shows a sectional view of the portable marking system 12 according to the section line IV-IV from FIG. 3.

Referring in particular to FIG. 4, a marking unit 38 can be seen. The marking unit 38 is arranged on an underside of the marking system 12, while the optical receiver 36 is located on an upper side of the marking system 12.

The marking unit 38 is arranged in particular centrally below the optical receiver 36. The marking unit 38 has 24 markers. The markers are formed as ink-jet nozzles arranged next to one another and evenly distributed over the length of the marking unit 38.

The invention claimed is:

1. A method for applying a position marking for a working position to a substrate in a building or a building element at a marking position assigned to the substrate, comprising:
   a. projecting a line of light onto the substrate in the building or the building element to define a marking area;
   b. unsystematically or systematically moving a portable marking system comprising an optical receiver over a marking area of the substrate;
   c. determining at least one position of the portable marking system by whether the optical receiver, which is a line sensor with multiple light sensitive pixels, of the portable marking system detects light from the projected line of light d. marking at the at least one determined position of the portable marking system, using a marking unit with an arrangement of multiple markers, provided that the optical receiver detects light at the projected line of light at the at least one determined position, wherein one or more of the multiple light sensitive pixels is respectively assigned a suitably positioned marker, which is activated as soon as the respective pixel detects light from the line of line.

2. The method as claimed in claim 1, including establishing a stationary coordinate system in relation to a ceiling of the substrate.

3. The method as claimed in claim 1, including determining at least one position of the portable marking system.

4. The method as claimed in claim 1, including using a marking unit with at least two markers for marking at the at least one determined position.

5. The method as claimed in claim 1, wherein a user moves the portable marking system manually over the marking area according to b.

6. The method as claimed in claim 1, including marking several position markings within the marking area.

7. The method as claimed in claim 1, including first moving the portable marking system to a starting point within the marking area as part of an initial positioning.

8. A portable marking system for marking a position marking on a substrate in a building or a building element at a marking position assigned to the position marking, comprising
   a marking unit with an arrangement of multiple markers;
   a position determining system for detecting a position of the marking system comprising an optical receiver which is a line sensor with multiple light sensitive pixels to detect a position of the marking system by checking whether the optical receiver detects light from a projected line of light; and
   a control unit which is set up to mark a position marking or at least part of the position marking on the substrate at least once by the marking unit if the marking system is at the marking position or is in a measuring range corresponding to a predefined or predefinable degree of accuracy around the marking position, and not to mark a marking if the marking system is outside the measuring range, wherein the marking unit corresponds to the arrangement of multiple markers and by one or more of the pixels respectively assigned a suitably positioned marker, which is activated as soon as the respective pixel detects light from the line of light.

9. The marking system as claimed in claim 8, wherein the marking system has a handle.

10. The marking system as claimed in claim 8, wherein the marking system has a guide rod and/or a receptacle for a guide rod.

11. The marking system as claimed in claim 8, wherein the marking system has at least one distance sensor, a structured light source in connection with a structured-light-receiving and evaluation unit, a transit time sensor and/or an acceleration sensor.

12. The marking system as claimed in claim 8, wherein the marking system has a tachymeter and/or is set up for communication with a tachymeter.

13. The marking system as claimed in claim 8, wherein the marking system comprises a motorized means of transport or in that the marking system can be arranged on the motorized means of transport.

14. The marking system as claimed in claim 8, wherein the marking system is set up to apply to the surrounding area a light geometry projected onto the surrounding area.

15. The method of claim 1, wherein the substrate is a wall, a ceiling, or a floor.

16. The method of claim 1, wherein b comprises regularly determining at least one position of the portable marking system.

17. The method of claim 4, including using at least 25 markers for marking the at least one determined position.

18. The method as claimed in claim 2, including determining at least two positions and/or a position range of the marking system in parallel.

\* \* \* \* \*